US007304817B1

(12) United States Patent
Kang et al.

(10) Patent No.: US 7,304,817 B1
(45) Date of Patent: Dec. 4, 2007

(54) JERK CONTROLLED SEEK SYSTEM

(75) Inventors: Chang-Ik Kang, Fremont, CA (US); Bong-Jin Lee, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/529,641

(22) Filed: Sep. 27, 2006

(51) Int. Cl.
*G11B 15/18* (2006.01)

(52) U.S. Cl. ........................................................ 360/69

(58) Field of Classification Search .................. 360/69, 360/75, 78.05, 78.09, 77.04, 55, 265.6; 318/599; 386/69; 702/186
See application file for complete search history.

(56) References Cited

U.S. PATENT DOCUMENTS 5,339,206 A * 8/1994 Takahashi .................... 360/75
5,978,752 A * 11/1999 Morris ........................ 702/186
5,986,426 A * 11/1999 Rowan ........................ 318/599
6,101,058 A * 8/2000 Morris ........................ 360/69
6,154,340 A * 11/2000 Cameron ..................... 360/75
6,444,583 B2 * 9/2002 Aoki .......................... 438/692
6,556,387 B1 * 4/2003 Misso et al. ............. 360/265.6
6,757,481 B1 * 6/2004 Nazarian et al. .............. 386/69
6,831,809 B2 * 12/2004 Kagami et al. .......... 360/78.09
7,075,748 B2 * 7/2006 White et al. ............. 360/78.05
2004/0246619 A1 * 12/2004 Zhang ..................... 360/77.04

* cited by examiner

*Primary Examiner*—Fred F. Tzeng
(74) *Attorney, Agent, or Firm*—Ben J. Yorks; Irell & Manella LLP

(57) ABSTRACT

A hard disk drive that includes a voice coil motor controlled by a servo circuit. The servo circuit provides a sinusoidal driving signal that has two different harmonic frequencies. The dual harmonic waveform creates a voice coil motor jerk profile (derivative of acceleration) that is continuous. The continuous jerk profile reduces vibration and seek time of the drive.

14 Claims, 5 Drawing Sheets

18
16
-12-
14
10
20
3
26
28
30
42
38
36
32
34
40

22
24
20

(CONTROLLER)
DSP
READ DATA
WRITE DATA
-64-
MEMORY
-76-
RG
66
68
WG
70
72
READ / WRITE
CHANNEL
-58-
MOTOR
CONTROL
-74-
-50-
READ DATA
54
60
READ/WRITE
ENABLE
WRITE DATA
56
PREAMP
-52-
VOICE COIL MOTOR
POSITION CONTROL
ROTATION CONTROL
20
20
20
20
14
12
12

JERK CONTROLLED SEEK SYSTEM

BACKGROUND OF THE INVENTION

1. Field of the Invention

The present invention relates to a servo routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A-B)-(C-D)) to create a position error signal ("PES"). The PES is used to create a drive signal for the voice coil motor to position the head on the track.

To access data at different disk tracks the drive enters a seek routine. During a seek routine a requested address location is provided and a corresponding seek time and drive current is calculated to drive the voice coil motor and move the heads to the desired location. The drive current provided to the voice coil motor typically has a sinusoidal waveform. The time derivative of the voice coil motor acceleration curve ("jerk") is discontinuous. This discontinuity can create unwanted mechanical vibration that increases the seek time of the heads and the access time of the drive. It would be desirable to provide a drive current waveform that does not have discontinuities in the voice coil motor jerk profile.

BRIEF SUMMARY OF THE INVENTION

A hard disk drive that contains a servo circuit that controls a voice coil motor. The servo circuit provides a driving current to the voice coil motor that has a sinusoidal waveform with two harmonic frequencies.

DETAILED DESCRIPTION

Described is a hard disk drive that includes a voice coil motor controlled by a servo circuit. The servo circuit provides a sinusoidal driving signal that has two different harmonic frequencies. The dual harmonic waveform creates a voice coil motor jerk profile (derivative of acceleration) that is continuous. The continuous jerk profile reduces vibration and seek time of the drive.

Figure 2:
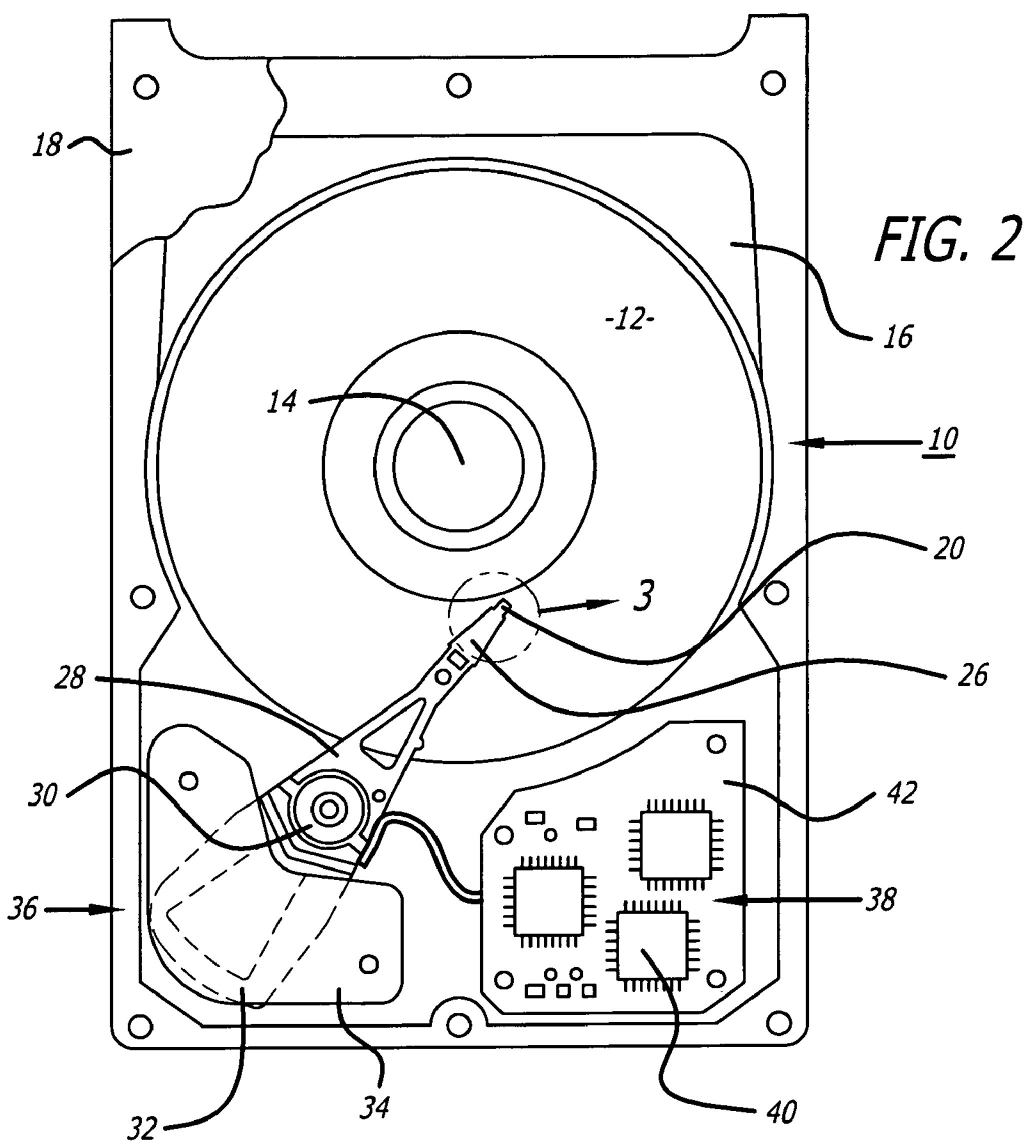
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
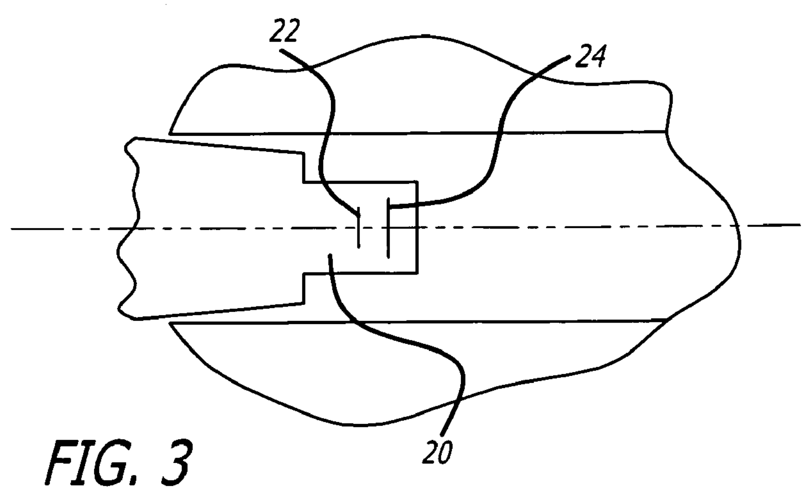
FIG. 3 is a top enlarged view of a head of the hard disk drive.

The disk drive 10 may include a plurality of heads 20 located adjacent to the disks 12. As shown in FIG. 3 the heads 20 may have separate write 24 and read elements 22. The write element 24 magnetizes the disk 12 to write data. The read element 22 senses the magnetic fields of the disks 12 to read data. By way of example, the read element 22 may be constructed from a magneto-resistive material that has a resistance which varies linearly with changes in magnetic flux.

Referring to FIG. 2, each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 4:
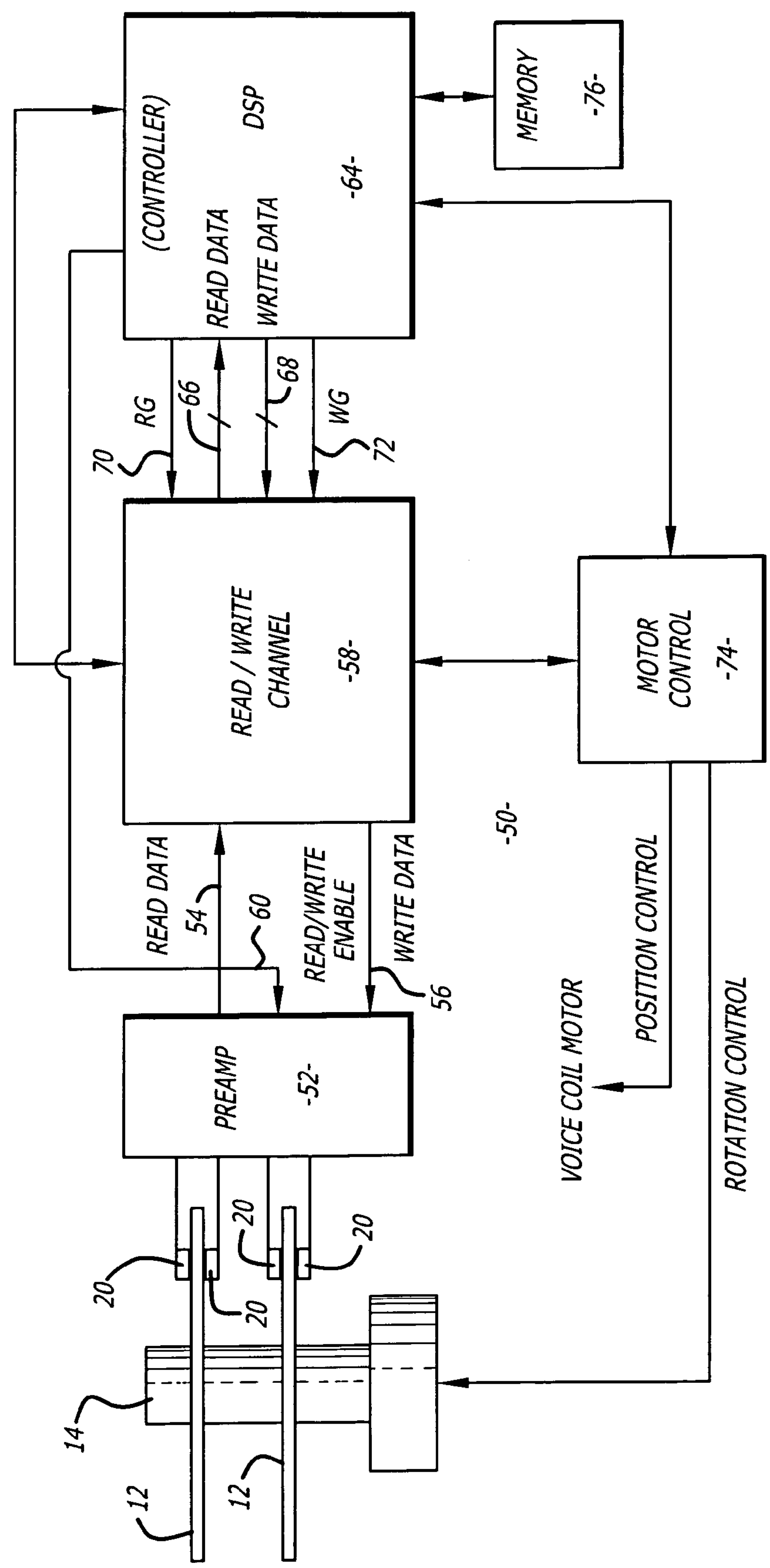
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36, spindle motor 14 and micro-actuator 44 of the disk drive 10. The controller 64 may be connected to a non-volatile memory device 76. By way of example, the device 76 may be a read only memory ("ROM") that contains instructions that are read by the controller 64.

Figure 1:
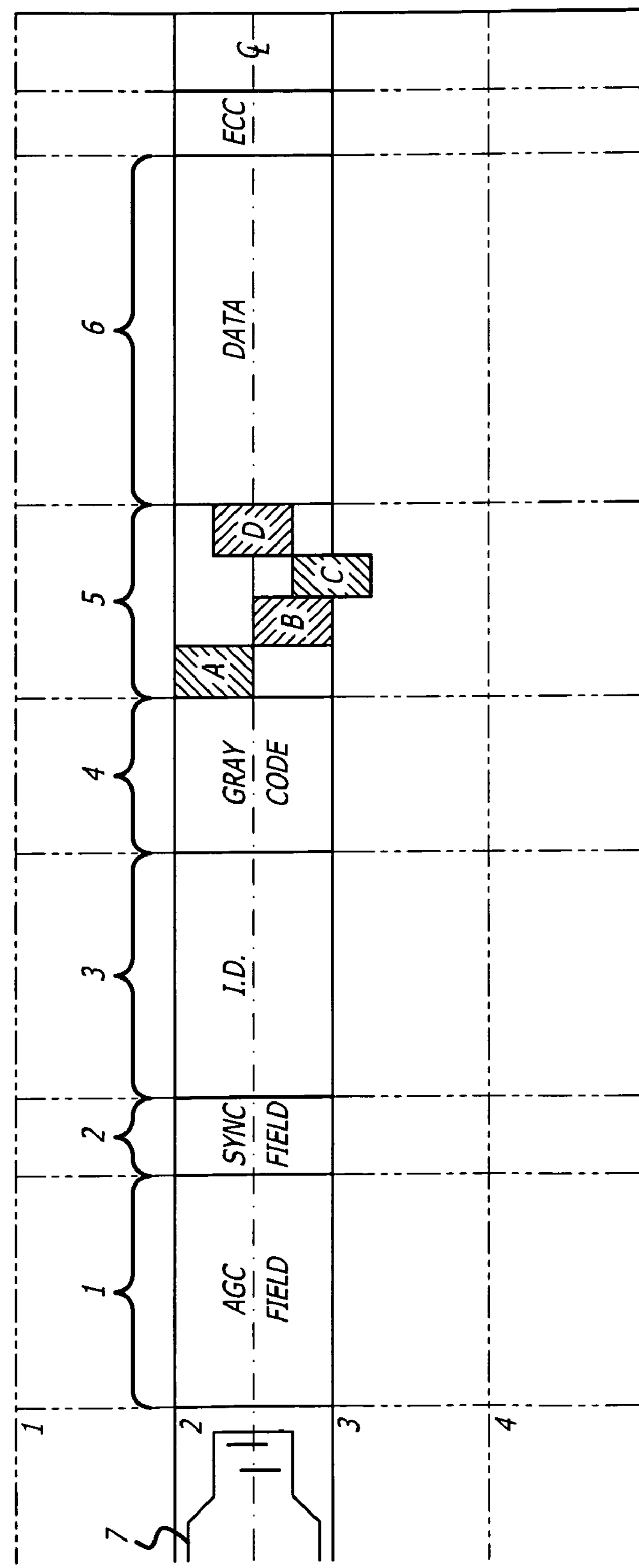
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 5:
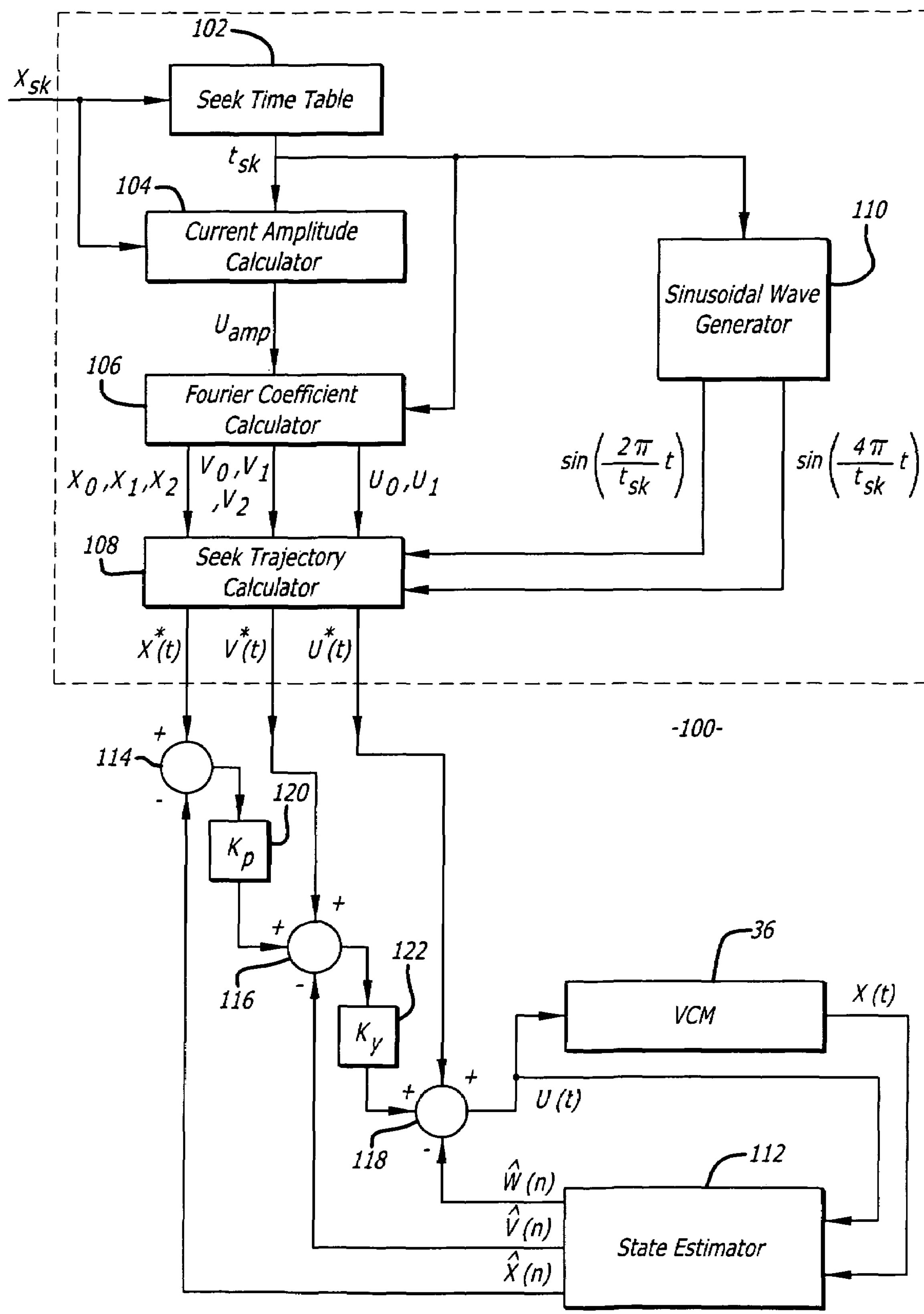
FIG. 5 is a schematic of a servo for the hard disk drive.

FIG. 5 shows a schematic of a servo 100 used to perform a seek operation. The servo is typically performed by the controller 64. In a seek operation the heads are moved from one track location to another track location. The seek distance $x_{sk}$ can be provided to a Seek Time Table 102 that provides a seek time $t_{sk}$ from a predefined table. A Current Amplitude Calculator 104 calculates an amplitude of a current trajectory $u_{amp}$ from the seek time $t_{sk}$ and the seek length $x_{sk}$. A Fourier Coefficient Calculator 106 then calculates position Fourier coefficients $x_0$, $x_1$ and $x_2$, velocity Fourier coefficients $v_0$, $v_1$, and $v_2$, and current Fourier coefficients $u_1$ and $u_2$. The Fourier coefficients are provided to a Seek Trajectory Calculator 108.

The servo circuit 100 includes a Sinusoidal Wave Generator 110 that generates a sinusoidal signal that has two different harmonic frequencies $$\frac{2\pi}{t_{sk}}\cdot t$$

and $$\frac{4\pi}{t_{sk}}\cdot t.$$

The See Trajectory Calculator 108 outputs position x*(t), velocity v*(t) and current u*(t) trajectories using the Fourier coefficients and two harmonic sinusoidal waveform. The trajectories x*(t), v*(t) and u*(t) may be expressed as follows:

$$u^*(t) = u_1\sin\left(\frac{2\pi}{t_{sk}}t\right) + u_2\sin\left(\frac{4\pi}{t_{sk}}t\right),\ 0 < t < t_{sk} \tag{1}$$

$$v^*(t) = v_0 + v_1\cos\left(\frac{2\pi}{t_{sk}}\right) + v_2\cos\left(\frac{4\pi}{t_{sk}}t\right),\ 0 < t < t_{sk} \tag{2}$$

$$x^*(t) = x_0 t + x_1\sin\left(\frac{2\pi}{t_{sk}}t\right) + x_2\sin\left(\frac{4\pi}{t_{sk}}t\right),\ 0 < t < t_{sk} \tag{3}$$

where the Fourier coefficients can be expressed as:

$$u_1 = u_{amp},\ u_2 = -\frac{u_{amp}}{2} \tag{4}$$

$$v_0 = \frac{3K_a u_{amp} t_{sk}}{8\pi},\ v_1 = -\frac{K_a u_{amp} t_{sk}}{2\pi},\ v_2 = \frac{K_a u_{amp} t_{sk}}{2\times 4\pi} \tag{5}$$

$$x_0 = \frac{3K_a u_{amp} t_{sk}}{8\pi},\ x_1 = \frac{K_a u_{amp} t_{sk}^2}{(2\pi)^2},\ x_2 = -\frac{K_a u_{amp} t_{sk}^2}{2\times(4\pi)^2} \tag{6}$$

where $k_a$ is an acceleration constant of the voice coil motor 36.

The Seek Trajectory Calculator 108 computes the trajectory utilizing equations (1)-(6). The relationship between the seek length $x_{sk}$ and the seek time $t_{sk}$ can be expressed as follows, where Ka is an acceleration constant of the voice coil motor:

$$x_{sk} = \frac{3K_a u_{amp}}{8\pi} t_{sk}^2 \tag{7}$$

The output of the Current Amplitude Calculator 104 can be defined as:

$$u_{amp} = \frac{8\pi}{3K_a t_{sk}^2} x_{sk} \tag{8}$$

The current trajectory u(t) is provided to the voice coil motor to move the heads to the desired track. The servo system may include a state estimator for feedforward control of the system. The estimator 112 may provide position ŵ(t), velocity v*(t) and torque ŵ(t), estimates to adders 114, 116 and 118 and multiplied by gain coefficients $K_p$ 120 and $K_v$ 122.

Figure 6:
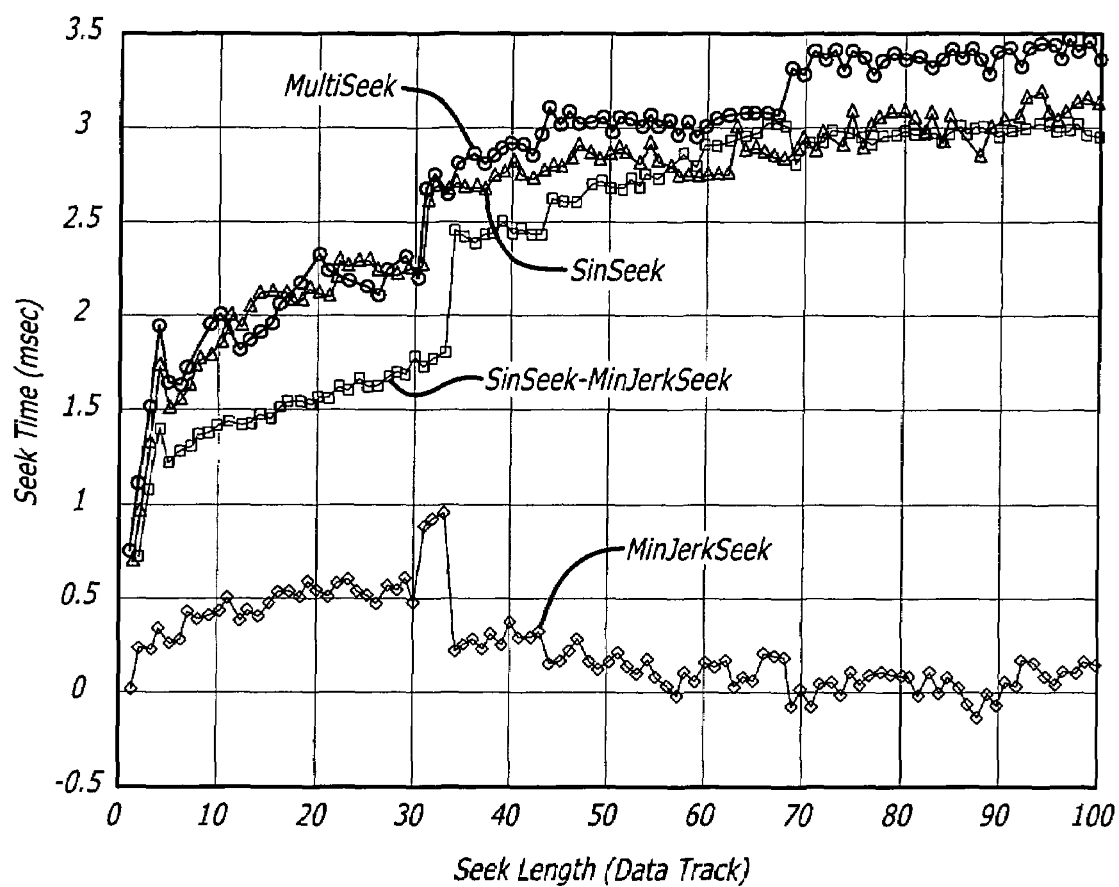
FIG. 6 is a graph showing seek time versus seek length for different seek trajectories.

FIG. 6 shows a comparison between prior art seek routines such as bang-bang seek (MultiSeek) and sinusoidal seek with one harmonic (SinSeek), with jerk controlled seek utilizing a two harmonic current waveform (MinJerkSeek). As can be seen the utilization of the two harmonic waveform reduces the seek time for a given seek length. The two harmonic waveform eliminates jerk discontinuities and reduces vibration. This reduces the seek time as shown in FIG. 6.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a disk;

a head coupled to said disk;

an actuator arm coupled to said head;

a voice coil motor actuator coupled to said actuator arm; and, a servo circuit coupled to said voice coil motor, said servo circuit provides a driving current to said voice coil motor that has a sinusoidal waveform with two harmonic frequencies.

2. The hard disk drive of claim 1, wherein said servo circuit includes a seek time table coupled to a current amplitude calculator, a fourier coefficient calculator coupled to said current amplitude calculator, a seek trajectory calculator coupled to said fourier coefficient calculator and a sinusoidal wave generator coupled to said seek trajectory calculator.

3. The hard disk drive of claim 1, wherein said driving current has the form of:

$$u^*(t) = u_1 \sin\left(\frac{2\pi}{t_{sk}}\right) + u_2 \sin\left(\frac{4\pi}{t_{sk}} t\right)$$

.

4. The hard disk drive of claim 1, wherein said servo circuit includes a feedforward loop.

5. The hard disk drive of claim 1, wherein said servo circuit includes a controller.

6. A hard disk drive, comprising:

a disk;

a head coupled to said disk;

an actuator arm coupled to said head;

a voice coil motor actuator coupled to said actuator arm; and, servo circuit means for providing a driving current to said voice coil motor that has a sinusoidal waveform with two harmonic frequencies.

7. The hard disk drive of claim 6, wherein said servo circuit means includes a seek time table coupled to a current amplitude calculator, a fourier coefficient calculator coupled to said current amplitude calculator, a seek trajectory calculator coupled to said fourier coefficient calculator and a sinusoidal wave generator coupled to said seek trajectory calculator.

8. The hard disk drive of claim 6, wherein said driving current has the form of:

$$u^*(t) = u_1 \sin\left(\frac{2\pi}{t_{sk}} t\right) + u_2 \sin\left(\frac{4\pi}{t_{sk}} t\right)$$

.

9. The hard disk drive of claim 6, wherein said servo circuit means includes a feedforward loop.

10. The hard disk drive of claim 6, wherein said servo circuit means includes a controller.

11. A method for driving a voice coil motor of a hard disk drive, comprising:

providing a driving current that has a sinusoidal waveform with two harmonic frequencies to a voice coil motor; and, moving the voice coil motor relative to a magnetic disk.

12. The method of claim 11, further comprising requesting a seek, providing a seek time in response to the seek request, calculating a current amplitude from the seek time, calculating a plurality of fourier coefficients from the current amplitude and determining the driving current from the fourier coefficients and the sinusoidal waveform.

13. The method of claim 11, wherein the driving current has the form of:

$$u^*(t) = u_1 \sin\left(\frac{2\pi}{t_{sk}} t\right) + u_2 \sin\left(\frac{4\pi}{t_{sk}} t\right).$$

14. The method of claim 11, further comprising providing a feedforward estimate to the driving current.

* * * * *